(12) United States Patent
Ishikawa

(10) Patent No.: US 11,321,131 B2
(45) Date of Patent: May 3, 2022

(54) EVALUATION DEVICE AND STORAGE MEDIUM STORING EVALUATION PROGRAM FOR SYSTEM LSI

(71) Applicants: KABUSHIKI KAISHA TOSHIBA, Minato-ku (JP); Toshiba Electronic Devices & Storage Corporation, Minato-ku (JP)

(72) Inventor: Yuji Ishikawa, Kawasaki (JP)

(73) Assignees: KABUSHIKI KAISHA TOSHIBA, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 331 days.

(21) Appl. No.: 16/534,049

(22) Filed: Aug. 7, 2019

(65) Prior Publication Data

US 2020/0310880 A1   Oct. 1, 2020

(30) Foreign Application Priority Data

Mar. 25, 2019  (JP) .............................. JP2019-055861

(51) Int. Cl.
*G06F 9/46*       (2006.01)
*G06F 9/50*       (2006.01)
(Continued)

(52) U.S. Cl.
CPC ........ *G06F 9/5016* (2013.01); *G06F 9/45558* (2013.01); *G06F 9/4812* (2013.01);
(Continued)

(58) Field of Classification Search
CPC .. G06F 9/5016; G06F 9/4812; G06F 9/45558; G06F 9/4818; G06F 9/4825;
(Continued)

(56) References Cited

U.S. PATENT DOCUMENTS 5,911,059 A * 6/1999 Profit, Jr. .............. G06F 11/261
                                                                703/23
2004/0268026 A1* 12/2004 Royer, Jr. ........... G06F 12/0802
                                                                711/104
(Continued)

FOREIGN PATENT DOCUMENTS

CN        105223443 A  *  1/2016
JP        2003-256239 A     9/2003
(Continued)

*Primary Examiner* — Emerson C Puente
*Assistant Examiner* — Zhi Chen
(74) *Attorney, Agent, or Firm* — Oblon, McClelland, Maier & Neustadt, L.L.P.

(57) ABSTRACT

According to one embodiment, an evaluation device includes one or more processors. The one or more processors performs detecting a process of activating a hardware of a system LSI from an application, interrupting execution of the application when the process of activating the hardware is detected, setting, as a load, a memory access pattern of the hardware estimated by simulating performance of the hardware, adding the load to resume the execution of the application, and collecting a profile related to a memory access during the execution of the application, including the load when the execution of the application is resumed.

10 Claims, 4 Drawing Sheets

(51) Int. Cl.
  *G06F 9/48* (2006.01)
  *G06F 9/455* (2018.01)
(52) U.S. Cl.
  CPC .............. *G06F 2009/45575* (2013.01); *G06F 2209/482* (2013.01)
(58) Field of Classification Search
  CPC ...... G06F 9/4831; G06F 9/4837; G06F 9/485; G06F 9/4843; G06F 2209/482; G06F 2009/45575; G06F 2009/45583; G06F 2009/45591; G06F 16/176; G06F 11/3034; G06F 11/3055
  See application file for complete search history.

(56) References Cited

U.S. PATENT DOCUMENTS

| | | | | |
|---|---|---|---|---|
| 2008/0109812 | A1* | 5/2008 | Vertes | G06F 9/52 718/104 |
| 2010/0004916 | A1* | 1/2010 | Stauder | G06Q 10/06 703/17 |
| 2010/0228843 | A1* | 9/2010 | Ok | H04L 12/66 709/223 |
| 2014/0005992 | A1* | 1/2014 | Deindl | G06F 30/331 703/4 |
| 2014/0204816 | A1* | 7/2014 | Ismail | H04W 52/0258 370/311 |
| 2015/0288659 | A1* | 10/2015 | Lukacs | G06F 21/575 713/2 |
| 2016/0170919 | A1* | 6/2016 | Blagodurov | G06F 11/34 711/154 |
| 2017/0192802 | A1* | 7/2017 | Sampathkumar | G06F 9/5077 |
| 2017/0293502 | A1 | 10/2017 | Kanaya et al. | |

FOREIGN PATENT DOCUMENTS

| | | |
|---|---|---|
| JP | 2016-42326 A | 3/2016 |
| JP | 2017-187993 A | 10/2017 |

* cited by examiner

EVALUATION DEVICE AND STORAGE MEDIUM STORING EVALUATION PROGRAM FOR SYSTEM LSI

CROSS-REFERENCE TO RELATED APPLICATIONS

This application is based upon and claims the benefit of priority from the Japanese Patent Application No. 2019-055861, filed Mar. 25, 2019, the entire contents of which are incorporated herein by reference.

FIELD

Embodiments described herein relate generally to an evaluation device and a storage medium storing an evaluation program for a system LSI.

BACKGROUND

In order to rapidly develop a complicated system LSI, it is important to proceed with the study on the architecture of the system LSI and the study on applications in parallel and to start software development at an early stage. On the other hand, when evaluating system LSI for which addition of new functions is planned, hardware corresponding to the new functions has not been developed, and it is difficult to make a highly accurate evaluation.

DETAILED DESCRIPTION

In general, according to one embodiment, an evaluation device includes one or more processors. The one or more processors performs detecting a process of activating a hardware of a system LSI from an application, interrupting execution of the application when the process of activating the hardware is detected, setting, as a load, a memory access pattern of the hardware estimated by simulating performance of the hardware, adding the load to resume the execution of the application, and collecting a profile related to a memory access during the execution of the application, including the load when the execution of the application is resumed.

Figure 1:
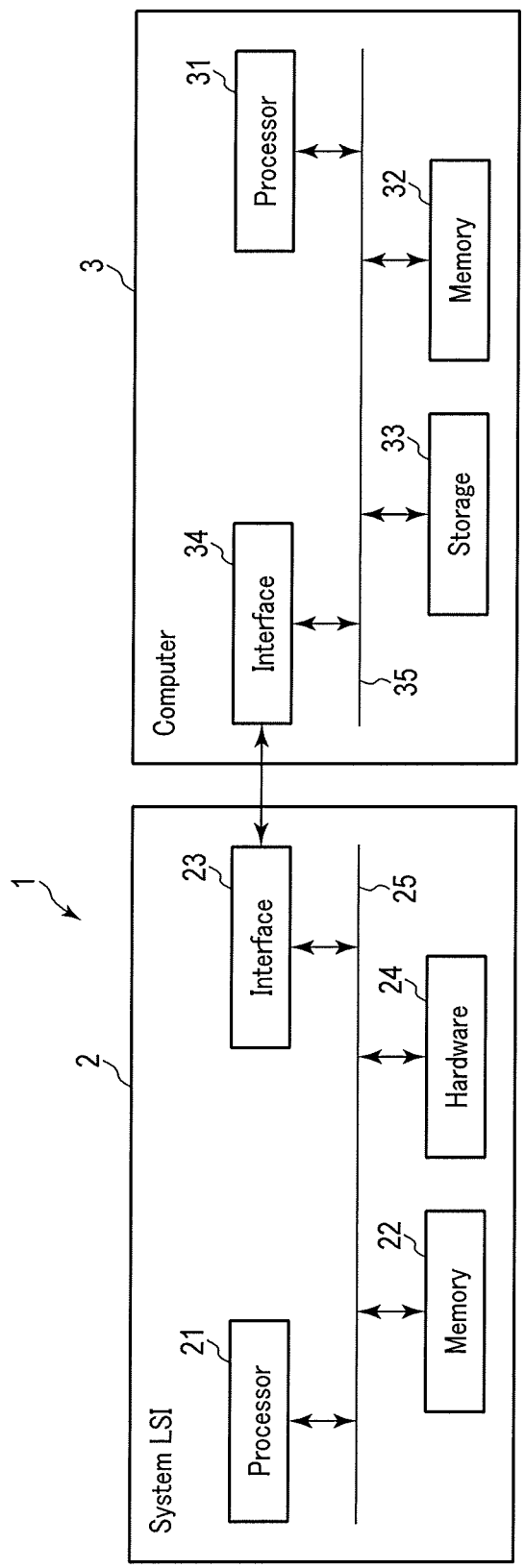
FIG. 1 is a block diagram illustrating a configuration of an evaluation system of a system LSI according to an embodiment.

Hereinafter, embodiments will be described with reference to the drawings. FIG. 1 is a block diagram illustrating a configuration of an evaluation system of a system LSI according to an embodiment. As illustrated in FIG. 1, an evaluation system 1 includes a system LSI 2 and a computer 3. The system LSI 2 and the computer 3 are connected so as to be able to communicate. The communication may be performed by wire, or may be performed by wireless. In addition, a communication method is not particularly limited.

The system LSI 2 includes a processor 21, a memory 22, an interface 23, and a hardware 24. The processor 21, the memory 22, the interface 23, and the hardware 24 are connected so as to be able to communicate with each other via a bus 25.

The processor 21 is, for example, a central processing unit (CPU). The processor 21 controls various processes of the system LSI 2. The processor 21 may be a multi-core processor configured by a plurality of CPUs and the like.

The memory 22 includes a random access memory (RAM) and a read only memory (ROM). The RAM is a readable and writable semiconductor memory. The RAM is a working memory configured to temporarily store various data used by the processor 21, the hardware 24, and the like. The ROM is a read only semiconductor memory. The ROM stores a program necessary for the operation of the system LSI 2. This program includes an operating system (OS) and an application. In addition, the program includes a hypervisor. The hypervisor is a control program configured to operate directly on hardware. The OS operates on the hypervisor.

The interface 23 is an interface on the system LSI 2 side for communication between the system LSI 2 and the computer 3. The interface 23 is, for example, a PCI. The interface 23 is not particularly limited.

The hardware 24 is a variety of hardware mounted on the system LSI 2. The hardware 24 is not particularly limited. For example, a memory area for a control register is allocated to the memory 22 for each hardware mounted as the hardware 24. For example, when there is a request for access to a memory area allocated to a specific hardware while the application is executed, a process for activating the corresponding hardware is performed. Note that, in the embodiment, a memory area for hardware not yet mounted on the system LSI 2 is also allocated.

The computer 3 is, for example, a personal computer. The computer 3 includes a processor 31, a memory 32, a storage 33, and an interface 34. The processor 31, the memory 32, the storage 33, and the interface 34 are connected so as to be able to communicate with each other via a bus 35.

The processor 31 is, for example, a CPU. As the processor 31, a graphic processing unit (GPU) can also be used. The processor 31 controls various processes of the computer 3. The processor 31 may be configured by a plurality of CPUs and the like.

The memory 32 includes a RAM. The RAM is a readable and writable semiconductor memory. The RAM is a working memory configured to temporarily store various data used by the processor 31 and the like.

The storage 33 is, for example, a hard disk. The storage 33 stores a program necessary for the operation of the computer 3. This program includes an operating system (OS) and the like. In addition, the storage 33 stores a simulation model configured to simulate the performance of the hardware of the system LSI 2.

The interface 34 is an interface on the computer 3 for communication between the system LSI 2 and the computer 3. The interface 34 is, for example, a PCI. The interface 34 is not particularly limited.

Figure 2:
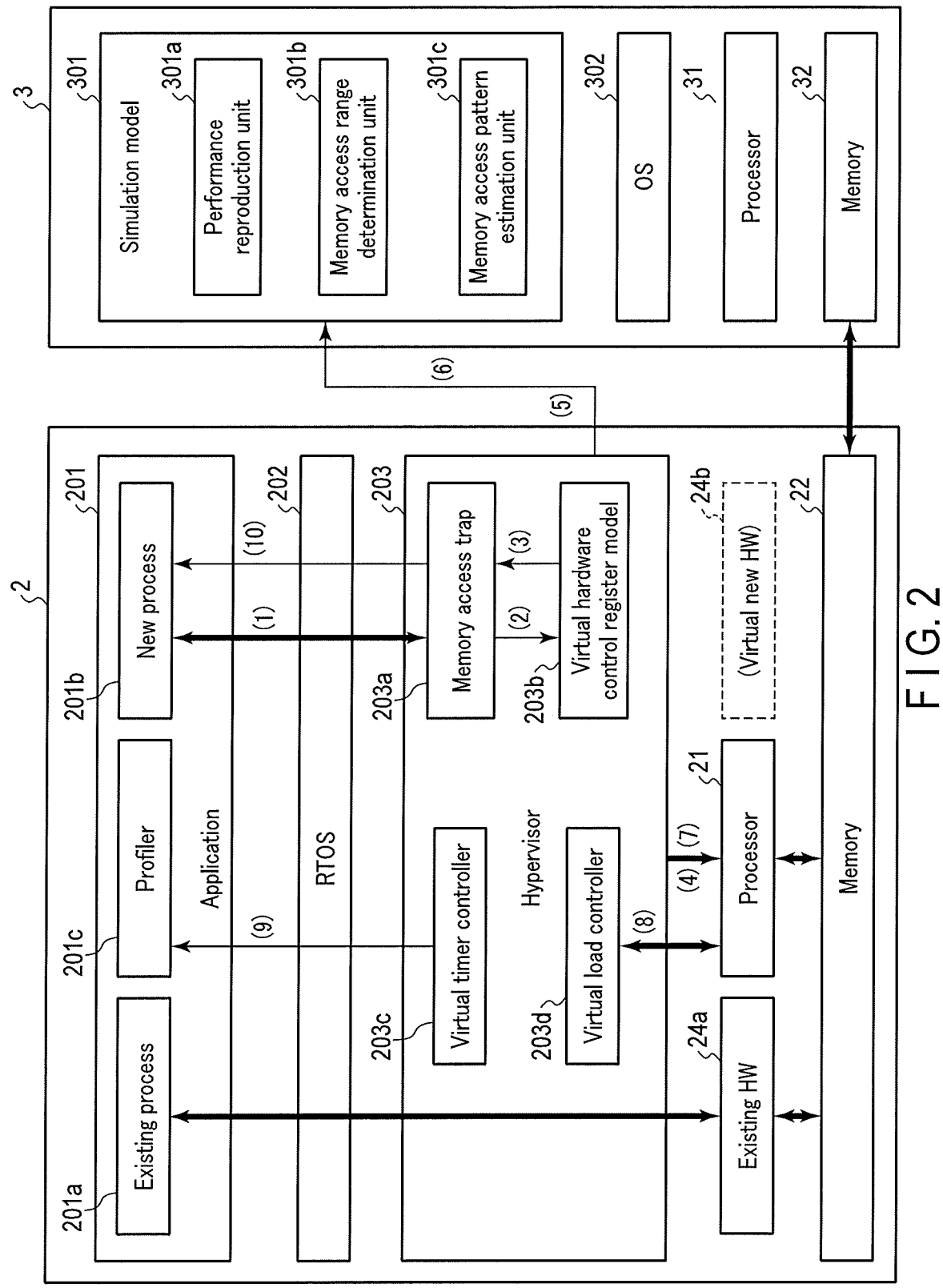
FIG. 2 is a functional block diagram of the evaluation system.

FIG. 2 is a functional block diagram of the evaluation system 1. Here, bold arrows in FIG. 2 indicate a request for hardware. In addition, thin arrows in FIG. 2 indicate a request for software.

In the embodiment, the application 201 of the system LSI 2 operates under the control of the OS. The OS of the system LSI 2 is, for example, a real-time OS (RTOS) 202. In addition, the application 201 includes not only a process (existing process) 201a using an existing hardware (HW) 24a that is the hardware 24 already mounted on the system LSI 2, but also a process (new process) 201b using a virtual new hardware (HW) 24b that is a new hardware 24 to be mounted, which is virtually prepared in the system LSI 2. In addition, the application 201 includes a profiler 201c for evaluating the system LSI. The profiler 201c collects a profile of the application 201 while referring to a hardware timer mounted as the hardware 24. The profile of the application 201 includes, for example, a profile related to a memory access, such as a memory access bandwidth at the time of executing the application 201, a memory access amount, a ratio of a calculation amount to a memory access amount (operation strength). As a method of the profiler 201c, a sampling method, an entrance and exit monitoring method, and the like may be used. The profile collected by the profiler 201c can be analyzed by, for example, the hypervisor 203. The profiler 201c may be in the hypervisor 203.

On the other hand, virtualization of hardware for evaluating the system LSI 2 is performed under control of the hypervisor 203. The hypervisor 203 operates directly on the hardware of the system LSI 2 including the processor 21 and the hardware 24. The hypervisor 203 includes a memory access trap 203a, a virtual hardware control register model 203b, a virtual timer controller 203c, and a virtual load controller 203d. The hypervisor 203 performs operations as the memory access trap 203a, the virtual hardware control register model 203b, the virtual timer controller 203c, and the virtual load controller 203d by using the processor 21 and the like as necessary. That is, the hypervisor 203 operates as the evaluation device of the system LSI 2.

When an access to a specific address of the memory 22 is detected by using a memory management unit (MMU) of the processor 21, the memory access trap 203a transfers the subsequent processes to the hypervisor 203.

The virtual hardware control register model 203b is a model configured to reproduce a process specific to each virtual hardware. The process specific to each virtual hardware includes, for example, an operation as a control register for each hardware and a process as a hardware when the control register is accessed.

The virtual timer controller 203c controls virtual timers configured to be viewed by the application 201 and the RTOS 202. As described above, the profiler 201c of the application 201 basically collects the application profile while referring to the hardware timer. When the virtual timer controller 203c sets the virtual timer, the application 201 and the RTOS 202 refer to the virtual timer. For example, when the virtual timer controller 203c operates the virtual timer so that the processing time performed on the hypervisor 203 is set to zero, the profile of the process performed on the hypervisor 203 is not collected by the profiler 201c.

The virtual load controller 203d is configured to apply a constant memory access load based on the simulation result of the hardware. The virtual load controller 203d applies a load by using a hardware for a memory access, such as a direct memory access controller (DMAC). The load may be applied by using a dedicated hardware configured to apply a load.

When the computer 3 receives a request from the hypervisor 203, the computer 3 simulates the performance of the hardware by using the simulation model 301. The simulation model 301 operates on the OS 302. The simulation model 301 includes a performance reproduction unit 301a, a memory access range determination unit 301b, and a memory access pattern estimation unit 301c. The simulation model 301 performs operations as the performance reproduction unit 301a, the memory access range determination unit 301b, and the memory access pattern estimation unit 301c by using the processor 31 and the like as necessary.

The performance reproduction unit 301a reproduces the performance of the hardware 24 of the system LSI 2 by the virtual hardware. The performance reproduction unit 301a is configured to be able to reproduce, for example, the performance of the virtual new hardware 24b. Here, the performance of the hardware includes, for example, to read input information from the memory, to perform hardware-specific calculation, and to write the calculation result to the memory. In addition, the performance reproduction unit 301a may be configured to be able to reproduce the performance of the existing hardware 24a.

The memory access range determination unit 301b determines, based on the set value to the virtual control register, which range of address the hardware reproducing the performance refers to so as to write or read.

The memory access pattern estimation unit 301c estimates by what access pattern the actual hardware 24 accesses the memory. The memory access pattern includes, for example, a temporal change of a memory access bandwidth when it is assumed that the virtual hardware performs the memory access (write/read) as the actual hardware 24, a temporal change of a memory access amount, and a total memory access amount within the time when the virtual hardware has performed the memory access as the actual hardware 24.

Figure 3:
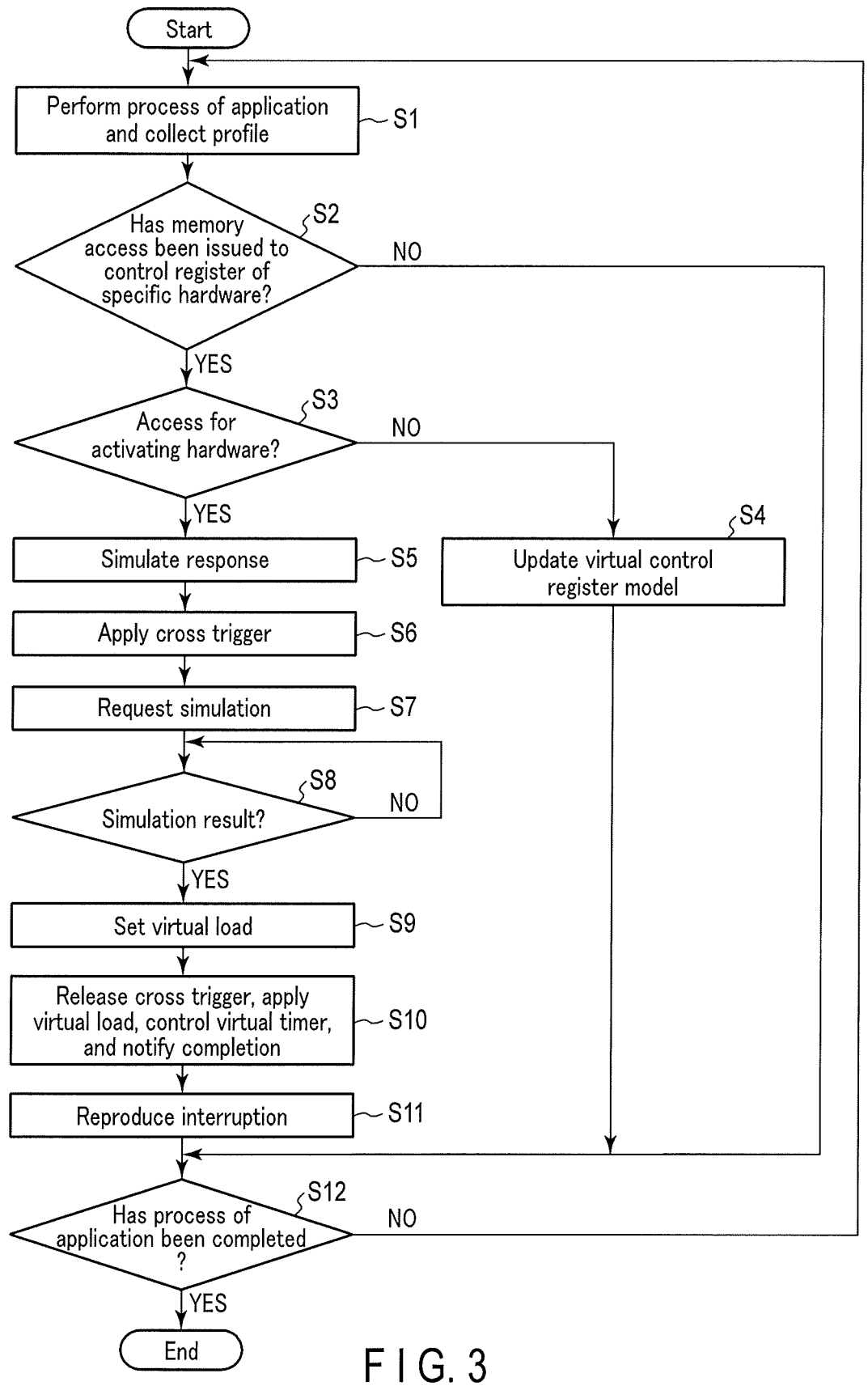
FIG. 3 is a flowchart illustrating the flow of processing of the evaluation system.

Hereinafter, the operation of the evaluation system 1 will be described in detail. FIG. 3 is a flowchart illustrating the flow of processing of the evaluation system 1. The process of FIG. 3 is started when the application 201 is activated by the user so as to evaluate the system LSI 2.

In step S1, when the application 201 is activated, the application 201 performs a process in accordance with a pre-programmed procedure. At this time, the profiler 201c of the application 201 acquires a running profile of the application 201.

Here, when it is necessary to activate the specific hardware, the application 201 issues the memory access to the control register allocated to the hardware. As described above, the control register includes a control register for the virtual new hardware 24b not yet mounted on the system LSI 2. That is, when the new process 201b is performed, the application 201 issues the memory access to the control register allocated to the virtual new hardware 24b ((1) of FIG. 2).

In step S2, the hypervisor 203 determines, by using the memory access trap 203a, whether the memory access to the specific hardware has been issued from the application 201. Here, the specific hardware is, for example, the virtual new hardware 24b. When it is determined in step S2 that the memory access to the specific hardware has not been issued, the process proceeds to step S12. When it is determined in step S2 that the memory access to the specific hardware has been issued, the process proceeds to step S3.

In step S3, the hypervisor 203 determines whether the memory access trapped by the memory access trap 203a is an access for activating the hardware. The memory access to the hardware includes an access for setting the hardware and an access for activating the hardware. When it is determined in step S3 that the memory access is not the access for activating the hardware, that is, when it is determined in step S3 that the memory access is the access for setting the hardware, the process proceeds to step S4. When it is determined in step S3 that the memory access is the access for activating the hardware, the process proceeds to step S5.

In step S4, the hypervisor 203 receives the memory access issued from the application 201. Then, the hypervisor 203 updates the setting of the virtual new hardware 24b corresponding to the new hardware set in the virtual hardware control register model 203b in response to the request from the application 201 ((2) of FIG. 2). After that, the process proceeds to step S12.

When it is determined in step S3 that the memory access is the access for activating the hardware, in step S5, the hypervisor 203 simulates a response based on the virtual hardware control register model 203b by outputting the setting of the virtual new hardware 24b set in the virtual hardware control register model 203b with respect to the application 201 ((3) of FIG. 2). In subsequent step S6, the hypervisor 203 stops the operation of a processor other than the processor used by the hypervisor 203 itself. For example, the hypervisor 203 uses a cross trigger to stop the operation of another processor ((4) of FIG. 2). Therefore, the application 201 is stopped.

In step S7, the hypervisor 203 requests the simulation model 301 for simulation by transmitting the contents set in the virtual hardware control register model 203b to the simulation model 301 of the computer 3 ((5) of FIG. 2).

In step S8, the hypervisor 203 determines whether the simulation result has been transmitted from the simulation model 301. In step S8, the hypervisor 203 waits for process until it is determined that the simulation result has been transmitted from the simulation model 301. When the simulation result has been transmitted from the simulation model 301 in step S8, the process proceeds to step S9.

In step S8, while the hypervisor 203 is waiting for the process, the simulation model 301 simulates the performance of the hardware based on the contents set in the virtual hardware control register model 203b.

Specifically, in the simulation model 301, the memory access range determination unit 301b specifies a memory block to be referred to for simulating the performance of the hardware. Then, the simulation model 301 copies the specified memory block to the RAM of the memory 32.

After that, the performance reproduction unit 301a of the simulation model 301 simulates the performance of the hardware. The simulation result is written to the copied memory block in the memory 32.

After that, the simulation model 301 reads the rewritten memory block in the memory 32 and writes the same to the memory 22. At this time, the memory access pattern estimation unit 301c of the simulation model 301 estimates the memory access pattern. After that, the simulation model 301 transmits the estimated memory access pattern to the hypervisor 203 as the simulation result.

Here, it returns to the description of FIG. 3. In step S9 after the simulation result is transmitted from the simulation model 301 ((6) of FIG. 2), the virtual load controller 203d of the hypervisor 203 sets the access pattern estimated by the simulation model 301 as a virtual load. For example, the strength of the virtual load can be acquired by dividing the total memory access amount of virtual hardware by the time when virtual hardware virtually accesses the memory.

In step S10, the hypervisor 203 releases the cross trigger to resume the process by another processor ((7) of FIG. 2). Therefore, the application 201 resumes the process. At the same time, the hypervisor 203 actually applies the load set as the virtual load to the bus 25. For example, the hypervisor 203 issues a dummy memory access by using the DMAC to apply the load to the bus 25 ((8) of FIG. 2). Furthermore, the virtual timer controller 203c of the hypervisor 203 sets the virtual timer to zero, thereby eliminating the time required for the simulation measured by the timer of the hardware 24 ((9) of FIG. 2). After the virtual load is applied, the hypervisor 203 notifies the application 201 that the process of the virtual new hardware 24b has been completed ((10) of FIG. 2). After that, the process proceeds to step S11.

In step S11, the hypervisor 203 virtually receives an interrupt at the time of completing the execution of the virtual load. Therefore, the interrupt is reproduced from the virtual hardware.

In step S12, the application 201 determines whether the process has been completed. When it is determined in step S12 that the process has not been completed, the process returns to step S1. When it is determined in step S12 that the process has been completed, the process of FIG. 3 is ended.

Figure 4A:
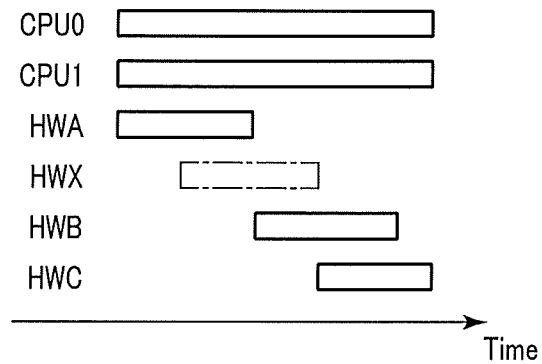
FIG. 4A is a diagram illustrating an example of operations of a processor and hardware assumed in an application.
Figure 4B:
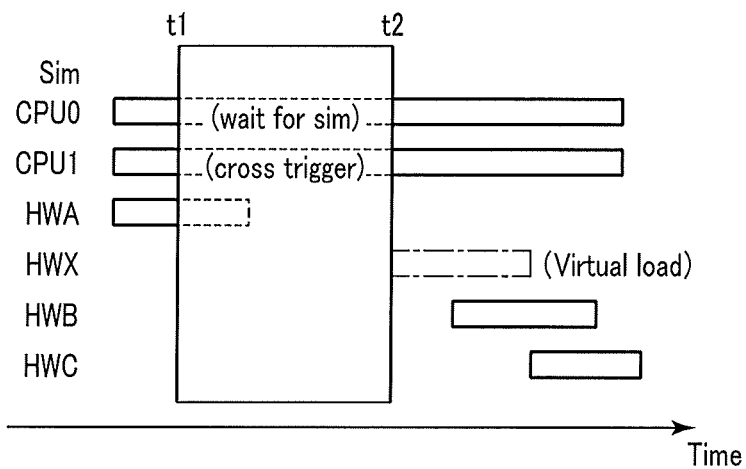
FIG. 4B is a diagram illustrating an example of operations of a processor and hardware according to an embodiment.

FIGS. 4A and 4B are diagrams for describing the effect of the embodiment. FIG. 4A is a diagram illustrating an example of operations of the processor 21 and the hardware 24 assumed in the application 201. FIG. 4B is a diagram illustrating an example of operations of the processor 21 and the hardware 24 according to an embodiment. The bar graphs of FIGS. 4A and 4B illustrate the progress of the operations of the processor 21 and the hardware 24 over time. CPU0 is the processor 21 used by the hypervisor 203. In addition, CPU1 is the processor used by the application 201. In addition, HWA, HWB, and HWC are the existing hardware 24a, and HWX is the virtual new hardware 24b.

First, as illustrated in FIG. 4A, the application 201 activates the HWA to perform the process on the memory 22, activates the HWX after activating the HWA to perform the process on the memory 22, activates the HWB after activating the HWX to perform the process on the memory 22, and activates the HWC after activating the HWB to perform the process on the memory 22. Among these, the processing time zones of the HWA and the HWX overlap, the processing time zones of the HWX and the HWB overlap, and the processing time zones of the HWB and the HWC overlap.

Here, the HWX is not yet mounted as the actual hardware. Therefore, the HWX cannot actually access the memory 22. Therefore, the hypervisor 203 performs the process as illustrated in FIG. 4B so as to operate the HWX as the virtual hardware.

That is, the hypervisor 203 (CPU0) causes the cross trigger to stop the operation of the CPU1 at a timing t1 at which the application 201 accesses the memory for activating the HWX. Therefore, the hypervisor 203 interrupts the process of the application 201. While the process of the application 201 is being interrupted, the hypervisor 203 causes the simulation model 301 of the computer 3 to simulate the performance of the HWX. During simulation by the computer 3 (Sim in the drawing), the CPU0 is on standby, and the CPU1 stops the operation by the cross trigger.

When the load assumed during the activation of the HWX is applied to the bus 25 from the memory access pattern acquired as the simulation result, the influence on the bus 25 of the HWX can be collected by the profiler 201c. Here, assuming that a timing at which the simulation is completed and the simulation result is transmitted to the hypervisor 203 is t2, since the simulation takes time (t2-t1), the profiler 201c referring to the timer of the hardware 24 collects a profile different from the profile of the original application 201 illustrated in FIG. 4A.

Therefore, in the embodiment, the hypervisor 203 sets the time required for the simulation to zero by controlling the virtual timer by the virtual timer controller 203c. As described above, when the virtual timer is set, the profiler 201c refers to the virtual timer, and thus the elapsed time from the start to the completion of the simulation for the profiler 201c is zero. Therefore, the profiler 201c does not collect profiles during the time required for simulation.

In this manner, the behavior of the HWX, which does not exist as the actual hardware 24, is reproduced in software, and the profile can be collected by the profiler 201c based on the overall behavior of each hardware in the process of the original application 201 in which such HWX and other HWA, HWB, and HWC existing as the actual hardware 24 are combined.

In addition, in the embodiment, the hypervisor 203 performs a hardware virtualization process. Therefore, the profile of the application 201 can be evaluated without changing the application 201 and the RTOS 202.

[Modification 1]

Hereinafter, modifications of the embodiment will be described. In the embodiment described above, the strength of the virtual load is a value obtained by dividing the total memory access amount of the virtual hardware by the time when the virtual hardware virtually accessed the memory, that is, an average value of the memory access amount. In practice, the memory access bandwidth and the memory access amount may not be uniform in the time axis, and may have a bias. Therefore, when the memory access pattern is estimated by the memory access pattern estimation unit 301c, it is preferable to divide data into segments in the time axis direction to estimate the memory access pattern. The segments may be divided at equal intervals, but are preferably divided at a time point when the ratio of memory access bandwidth or the calculation amount to the memory access amount (calculation strength) changes. The virtual load controller 203d of the hypervisor 203 sets the virtual load for each segment. This allows the profiler 201c to collect a profile that is more in line with the process of the actual application 201.

[Modification 2]

In the embodiment, the operation of the processor other than the processor used by the hypervisor 203 is stopped by the cross trigger. Therefore, the process of the application 201 can be interrupted. Since only the processor is stopped by the cross trigger, the hardware 24 activated before the cross trigger is applied does not stop its operation until its process is completed. For example, in FIG. 4B, the HWA continues to operate even after the cross trigger is applied. In this case, since the memory access is not performed by the HWA after the cross trigger is released, the process is different from the process of the original application 201 illustrated in FIG. 4A.

Figure 5:
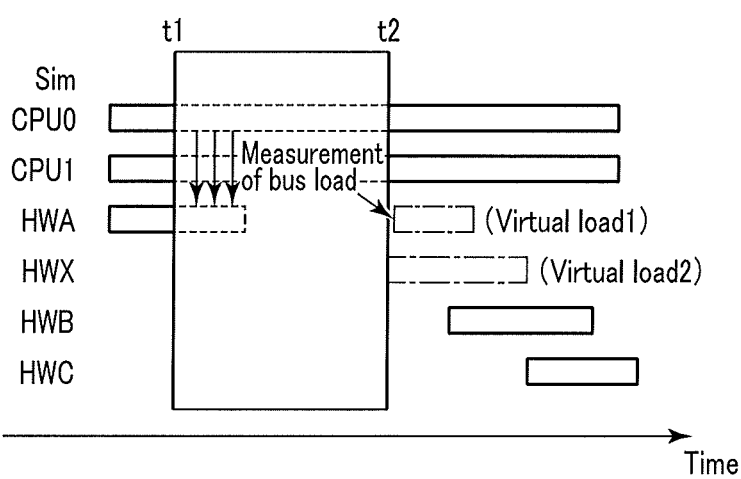
FIG. 5 is a diagram illustrating an example of operations of a processor and hardware according to modification 2.

Here, the hypervisor 203 can use the processor that has been cross-triggered and stopped. Therefore, the hypervisor 203 (CPU0) measures the bus load of the HWA during simulation as illustrated in FIG. 5. The bus load can be measured by a performance meter provided in the hardware 24. When the cross trigger is released, the hypervisor 203 applies a virtual load 1, which is the load of the HWA measured by the performance meter or the like, and a virtual load 2, which is the load of the HWX acquired based on the simulation result, to the bus 25 as the virtual loads. This allows the profiler 201c to collect a profile that is more in line with the process of the actual application 201. The measurement of the bus load of the HWA may be performed by using the CPU1.

[Other Modifications]

In the embodiment described above, it is assumed that the specific hardware to be virtualized is the virtual new hardware 24b not mounted on the system LSI 2. However, the specific hardware to be virtualized may be the existing hardware 24a mounted on the system LSI 2.

In addition, in the embodiment, the simulation for virtualization is assumed to be the computer 3 outside the system LSI 2. However, the simulation for virtualization may be performed by the system LSI 2.

In addition, in the embodiment, the hardware virtualization process is performed by the hypervisor 203. However, the hardware virtualization process may not be performed by the hypervisor 203. For example, the hardware virtualization process may be performed by the RTOS 202.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An evaluation device comprising one or more processors configured to perform:
   detecting a process of activating a hardware of a system LSI from an application;
   interrupting execution of the application when the process of activating the hardware is detected;
   setting, as a load, a memory access pattern of the hardware estimated by simulating performance of the hardware;
   resuming the execution of the application;
   applying the load to the execution of the application; and
   collecting a profile related to a memory access during the execution of the application, including the load when the execution of the application is resumed.

2. The evaluation device according to claim 1, wherein the memory access pattern comprises a plurality of segments, the segments being divided in a time point at which a ratio of a memory access bandwidth to a memory access amount changes.

3. The evaluation device according to claim 1, wherein the detecting, the interrupting, the setting, and the resuming are performed by a hypervisor.

4. The evaluation device according to claim 1, wherein all of the one or more processors are stopped in a period during which the performance of the hardware is simulated.

5. The evaluation device according to claim 1, wherein simulating of the performance of the hardware is performed by a computer connected so as to be able to communicate with the system LSI.

6. The evaluation device according to claim 1, wherein the simulating of the performance of the hardware is performed by a software process.

7. The evaluation device according to claim 1, wherein a bus load of the hardware operating during the simulating of the performance of the hardware is measured, and
   the one or more processors further add the bus load to the load that is applied to the execution of the application.

8. The evaluation device according to claim 1, wherein the one or more processors are provided in the system LSI.

9. The evaluation device according to claim 1, wherein the performance of the hardware includes to read input information from a memory, to perform hardware-specific calculation, and to write the calculation result to the memory.

10. A non-transitory storage medium storing an evaluation program for a processor-readable system LSI to be executed by a processor, the evaluation program comprising:
- detecting a process of activating a hardware from an application;
- interrupting execution of the application when the process of activating the hardware is detected;
- setting, as a load, a memory access pattern of the hardware estimated by simulating performance of the hardware;
- resuming the execution of the application;
- applying the load to the execution of the application; and
- collecting a profile related to a memory access during the execution of the application, including the load when the execution of the application is resumed.

* * * * *